United States Patent [19]

Hovestadt et al.

[11] Patent Number: 5,344,851
[45] Date of Patent: * Sep. 6, 1994

[54] PROCESS FOR RECOVERING BINDER COMPONENTS FROM LACQUER SLUDGE

[75] Inventors: Wieland Hovestadt, Krefeld; Jochen Brück, Cologne; Volker Schneider, Wachtendonk, all of Fed. Rep. of Germany

[73] Assignee: Bayer Aktiengesellschaft, Leverkusen, Fed. Rep. of Germany

[ * ] Notice: The portion of the term of this patent subsequent to Jan. 25, 2011 has been disclaimed.

[21] Appl. No.: 54,931

[22] Filed: Apr. 28, 1993

[30] Foreign Application Priority Data

May 6, 1992 [DE] Fed. Rep. of Germany ....... 4214943

[51] Int. Cl.$^5$ ............................................. C08G 18/14
[52] U.S. Cl. .................................... 521/49; 521/49.5; 528/45; 528/49; 528/67
[58] Field of Search .................. 521/49, 49.5; 528/45, 528/47, 49, 67

[56] References Cited

U.S. PATENT DOCUMENTS

| | | | |
|---|---|---|---|
| 4,220,456 | 9/1980 | Block | 55/85 |
| 4,629,477 | 12/1986 | Geke | 55/85 |
| 4,687,520 | 8/1987 | Seng | 106/271 |

FOREIGN PATENT DOCUMENTS 556670 8/1993 European Pat. Off. .

OTHER PUBLICATIONS

Copending Application Ser. No. 08/015,728, filed: Feb. 10, 1993, Inventors: Hovestadt et al. "Process for Recovering and Recycling Organic Binder Components from a Coatings Slurry", Now, U.S. Pat. No. 5,281,629.

*Primary Examiner*—Paul R. Michl
*Assistant Examiner*—Olga Asinovsky
*Attorney, Agent, or Firm*—Joseph C. Gil; Thomas W. Roy

[57] ABSTRACT

The present invention relates to a process for recovering and recycling the organic binder components accumulating as overspray during the spraying of a solvent-containing, two-component polyurethane lacquer or a solvent-containing, moisture-curing, one-component polyurethane lacquer by i) washing the overspray out of the exhaust air of a coating plant with the aid of an aqueous medium which a) contains in dissolved or dispersed form compounds that exhibit greater reactivity towards isocyanate groups than either water or the isocyanate-reactive groups present in two-component polyurethane lacquers, and b) may contain emulsifiers, ii) isolating the chemically modified overspray formed in step (i) in the form of lacquer sludge by treatment with coagulating agents, which may be present in the aqueous medium, iii) mixing the lacquer sludge, containing fully reacted lacquer constituents, coagulating agents and water, optionally after a portion of the water is removed, with an organic solvent and iv) separating the organic phase accumulating in step iii) from the aqueous phase and insoluble-constituents which may be present and recovering the solution of modified organic binder components dissolved in the organic phase.

8 Claims, No Drawings

PROCESS FOR RECOVERING BINDER COMPONENTS FROM LACQUER SLUDGE

BACKGROUND OF THE INVENTION

1. Field of the Invention

The present invention relates to a process for the recovering and reusing organic binder components from the lacquer sludge accumulating during the spraying of solvent-containing, one- or two-component polyurethane lacquers.

2. Description of the Prior Art

Two-component polyurethane lacquers containing solvent have by virtue of their outstanding characteristics acquired great practical importance in the coating industry. In practice, the lacquers are as a rule applied by spray onto the substrates to be coated. With this process it is not possible to avoid considerable amounts of the coating agent employed being lost as a result of overspray. In practice these excess amounts are generally washed out of the exhaust air of the coating plant with the aid of water and are caused to coagulate by the use of coagulating agents, for example, surface-active, inorganic material such as alumina. Previously, it has not been possible to re-use this "lacquer sludge."

An object of the present invention is to develop a method which enables useful processing of the binder components present in the lacquer sludge before these components become totally unusable as a result of the steadily progressing crosslinking reaction. The process should also be applicable to solvent-containing, one-component polyurethane lacquers, wherein the binders are NCO prepolymers which undergo curing in the presence of moisture.

It has now been found that that this objective may be achieved such that lacquers containing
   a) organic polyisocyanates,
   b) preferably, in the case of two-component polyurethane lacquers, organic compounds with groups capable of reacting with isocyanate groups, preferably organic polyhydroxyl compounds,
   c) optionally pigments and other additives and
   d) solvent, can be recovered and reused if the overspray of the lacquer is caused to react with compounds which i) have been dissolved or dispersed in the water of the coating plant, optionally by the use of emulsifiers, and ii) contain groups which are more reactive with isocyanate groups than the reaction partners of the polyisocyanates and water. The lacquer sludge is isolated by the use of coagulating agents and the organic constituents are extracted.

SUMMARY OF THE INVENTION

The present invention relates to a process for recovering and recycling the organic binder components accumulating as overspray during the spraying of a solvent-containing, two-component polyurethane lacquer or a solvent-containing, moisture-curing, one-component polyurethane lacquer by
   i) washing the overspray out of the exhaust air of a coating plant with the aid of an aqueous medium which a) contains in dissolved or dispersed form compounds that exhibit greater reactivity towards isocyanate groups than either water or the isocyanate-reactive groups present in two-component polyurethane lacquers, and b) may contain emulsifiers,
   ii) isolating the chemically modified overspray formed in step (i) in the form of lacquer sludge by treatment with coagulating agents, Which may be present in the aqueous medium,
   iii) mixing the lacquer sludge, containing fully reacted lacquer constituents, coagulating agents and water, optionally after a portion of the water is removed, with an organic solvent and
   iv) separating the organic phase accumulating in step iii) from the aqueous phase and insoluble constituents which may be present and recovering the solution of modified organic binder components dissolved in the organic phase.

DETAILED DESCRIPTION OF THE INVENTION

The term "overspray" means the components of the lacquer which during spraying do not remain in contact with the substrate to be coated and, therefore, get into the exhaust air of the coating plant.

The process according to the invention serves to recondition lacquer sludge accumulating during the processing of two-component polyurethane lacquers and one-component lacquers which cure in the presence of moisture.

The polyisocyanate component of two-component polyurethane lacquers are preferably of "lacquer polyisocyanates," i.e., derivatives of monomeric diisocyanates containing biuret, isocyanurate, urethane, allophanate and/or uretdione groups. Examples of these monomeric diisocyanates include, in particular, 1,6-diisocyanatohexane or mixtures of 1,6-diisocyanatohexane with 1-isocyanato-3,3,5-trimethyl-5-isocyanatoethyl-cyclohexane and/or, less preferably, those based on aromatic diisocyanates such as 2,4- and/or 2,6-diisocyanato-toluene. These lacquer polyisocyanates are known and generally have a content of monomeric diisocyanates of less than 0.5% by weight and a content of isocyanate groups of about 15–25% by weight.

The reaction partners which are reactive with the polyisocyanates in the two-component polyurethane lacquers are known and are preferably polyhydroxyl compounds having a relatively high molecular weight and a hydroxyl-group content of 0.1 to 10% by weight. Examples are the known hydroxy-functional polyesters, polyethers, polyacrylates, polyurethanes, polydiene resins and epoxy resins as well as mixtures or reaction products of these polyhydroxyl compounds.

The one-component polyurethane lacquers which are less preferred in accordance with the invention are those wherein the binder contains an NCO prepolymer which has an NCO content of about 3 to 16% by weight and is obtained by the reaction of the monomeric diisocyanates and/or lacquer polyisocyanates previously set forth with less than stoichiometric quantities of the previously described polyhydroxyl compounds.

Pigments, fillers and other additives (such as levelling agents, gloss-enhancing agents, anti-settling agents, thickening agents, thixotropic agents, anti-oxidants and heat stabilizers), which may optionally be present in the lacquers, have no influence on the process according to the invention. Depending on their solubility, these components are recovered either in the organic phase accumulating in accordance with process step (iv) or in the insoluble solid phase.

The compounds used in process step (i) having groups capable of reacting with isocyanate groups are preferably compounds which are monofunctional in the isocyanate addition reaction and react more readily with isocyanate groups than water and the reactive components used in two-component polyurethane lacquers (in particular, the polyhydroxyl compounds described above). Examples include primary or secondary monoamines having aliphatically or cycloaliphatically bound amino groups such as n-butylamine, isobutylamine, n-pentylamine, n-hexylamine, n-stearylamine, dimethylamine, diethylamine, di-n-propylamine, di-n-butylamine, di-n-pentylamine, di-n-hexylamine, diisopropylamine, n-methyl-n-stearylamine, di-n-hexylamine, diisopropylamine, n-methyl-n-stearylamine, di-n-stearylamine, cyclohexylamine, piperidine, pyrrolidine or morpholine. Also suitable but less preferred are aromatic, primary and secondary monofunctional amines.

In the process according to the invention, mixtures of monoamines may be used as the reactive component for organic polyisocyanates. The highly volatile monoamines are comparable to the blocking agents named below, so that the resulting products according to the invention can be used in or as stoving lacquers. When these lacquers are cured the monoamines are split off like blocking agents.

A further group of compounds with groups capable of reacting with isocyanate groups and which can be used in process step (i) are monofunctional blocking agents that are highly reactive with isocyanate groups, preferably oximes such as acetone oxime, butanone oxime or cyclohexanone oxime. When these blocking agents are used in the process according to the invention, solutions or binding agent mixtures are obtained which can be used as stoving lacquers. For both these blocking agents and the highly volatile monoamines, the stoving lacquers may either be solvent-containing stoving lacquers or (after removal of the solvent, e.g., by spray drying) lacquers in powder form.

A further group of compounds which can be used in process step (i) are amino alcohols. Because of the significant difference in reactivity of the amino and hydroxyl groups, the aminoalcohols may be considered to be monofunctional in the isocyanate addition reaction, particularly when they are used in quantities such that at least one amino group is present for each isocyanate group. Examples of amino alcohols include 2-aminoethanol, 2-(methylamino)-ethanol, diethanolamine, 3-amino-1-propanol, 1-amino-2-propanol, diisopropanolamine, 2-amino-2-methyl-propanol, 2-amino-2-methyl-1,3-propanediol, 2-amino-2-hydroxymethyl-1,3-propanediol and mixtures thereof.

When amino alcohols are used in the process according to the invention, solutions or mixtures of organic polyhydroxyl compounds are obtained which may be reused as the polyol component in two-component polyurethane lacquers.

Also suitable, although less preferred, for use as compounds with groups capable of reacting with isocyanate groups in process step (i), are compounds which, in addition to a group that is highly reactive with isocyanate groups, have an additional functional group, in particular a carboxylate or sulphonate group. Examples of these compounds include, in particular, the alkali salts of aminocarboxylic acids or aminosulphonic acids. The use of these compounds results in reaction products which are dispersible in water and, thus, may be used as additives for aqueous coating compositions.

Also suitable are mixtures of the preceding compounds, which may also contain other compounds which react more readily with isocyanate groups than water and the reactive component used in two-component polyurethane lacquers.

Particularly preferred compounds for use in process step (i) are the previously described secondary monoamines, oximes and amino alcohols.

If the compound having groups capable of reacting with isocyanate groups that is used in process step (i) is insoluble in the water of the coating plant it can be converted into a water-soluble or water-dispersible form by admixture with known anionic, cationic and/or nonionic emulsifiers.

Preferred anionic and nonionic emulsifiers include:
1) alkyl sulphates, preferably those having a chain length of 8 to 18 carbons atoms; and alkyl and alkylaryl ether sulphates having 8 to 18 carbons atoms in the hydrophobic residue and 1 to 40 ethylene oxide and/or propylene oxide units;
2) sulphonates, particularly alkyl sulphonates having 8 to 18 carbons atoms; alkylaryl sulphonates having 8 to 18 carbons atoms; and taurides, esters and half-esters of sulphosuccinic acid with monovalent alcohols or alkyl phenols having 4 to 15 carbons atoms in the alkyl residue; these alcohols or alkyl phenols can also be ethoxylated with 1 to 40 ethylene oxide units;
3) partial esters of phosphoric acid and the alkali and ammonium salts thereof, in particular alkyl or alkylaryl phosphonates having 8 to 20 carbons atoms in the organic residue; and alkyl ethers or alkylaryl ether phosphates having 8 to 20 carbons atoms in the alkyl or alkylaryl residue and 1 to 40 ethylene oxide units;
4) alkyl polyglycol ethers, preferably having 8 to 40 ethylene oxide units and alkyl residues of 8 to 20 carbons atoms;
5) alkylaryl polyglycol ethers, preferably having 8 to 40 ethylene oxide units and 8 to 20 carbons atoms in the alkyl and aryl residues;
6) ethylene oxide/propylene oxide (EO/PO) block copolymers, preferably having 8 to 40 ethylene oxide or propylene oxide units;
7) ammonium amphiphiles having a chain length of 4 to 15 carbons atoms in the alkyl residues; and/or
8) mixtures of these and/or other emulsifiers or surface-active substances.

The coagulating agents used in the process according to the invention is selected from substances which have a certain affinity for the organic components of the lacquers and inhibit gumming, i.e., they prevent adhesion of the lacquer components to the equipment and containers employed. The use of the coagulating agents in combination with water generally causes the formation of a multi-phase system in which the organic binder components of the lacquers, which are chemically modified in process step i), are present either coagulated or adsorbed on the coagulating agent. These solid constituents can be separated from the major portion of the water and continuously removed by flotation or sedimentation. The solids make up the lacquer sludge isolated in process step (ii).

Suitable coagulating agents include surface-active substances, e.g., metal oxides or hydroxides such as aluminium oxides or hydroxides, iron oxides, hydrated iron oxides and iron hydroxides; sheet silicates; wax emulsions; and alumina. The preferred coagulating agent is alumina. The preferred coagulating agents are insoluble both in water and the extracting agent used.

The solvents or extracting agents used in process step (iii) are preferably solvents of the type also used in the original lacquers; however, the solvents do not are not required to be identical. Suitable solvents include acetone, methylethylketone, methyl isobutylketone, cyclopentanone, cyclohexanone; aromatic substances such as benzene, toluene, xylene, chlorobenzene and nitrobenzene; ethers such as tetrahydrofuran, dioxan and 2-butoxyethanol; esters such as ethyl acetate, propyl acetate, butyl acetate and chlorinated hydrocarbons; aprotic solvents such as dimethylformamide, dimethylacetamide and dimethylsulphoxide; and mixtures of these solvents.

Preferred solvents are those in which the organic lacquer components are highly soluble, but which are not themselves miscible with water, or are only miscible with water to a limited extent. Examples of these solvents include butyl acetate and, in particular, aromatic hydrocarbons such as toluene or xylene.

For carrying out the process according to the invention, water is used in a very great excess relative to the lacquer components accumulating as overspray. The coagulating agents are generally used in quantities of 1 to 1000%, preferably 5 to 500% by weight, based on the weight of the overspray.

The quantity of the component having groups capable of reacting with isocyanate groups that is used in process step (i) is 0.001–50%, preferably 0.05 to 10% by weight, based on the amount of water. This quantity is also selected to ensure that for every isocyanate group present in the overspray there is at least 0.25, preferably at least 0.9 and more preferably at least 1.0 group that is highly reactive with isocyanate groups.

The quantity of the emulsifier, which may optionally be used, is kept as small as possible and amounts to 0.01–50%, preferably 0.1 to 20% by weight, based on the component from process step i) having groups capable of reacting with isocyanate groups.

The quantity of the solvent in process step (iii) is chosen to enable effective separation between the solid and liquid phases. Preferably, a 0.5-fold to 5-fold quantity based on the weight of the lacquer sludge is sufficient. The lacquer sludge contains the coagulating agent, adhering water and fully reacted lacquer constituents.

For carrying out the process according to the invention, the compounds that are highly reactive with isocyanate groups are dissolved or dispersed in the wash water of the spray plant, and the resulting aqueous solution or dispersion is used for washing out the exhaust air. A reaction of the isocyanate groups present in the overspray takes place spontaneously with these highly reactive groups.

The washing process and the reaction generally takes place at a temperature of 0 to 100° C, preferably 10 to 60° C. The modified lacquer components accumulating in the wash water are isolated in process step (ii) by the use of the coagulating agents. Process steps (i) and (ii) may run simultaneously or sequentially. In one embodiment the coagulating agent may be mixed with the aqueous solution or dispersion containing the highly reactive compound so that the chemical modification and the formation of the lacquer sludge by coagulation occur essentially simultaneously. In a second embodiment, the chemical reaction according to process step i) is initially carried out and then the coagulating agents are added to isolate the lacquer sludge as coagulant.

The lacquer sludge is then separated out by flotation or sedimentation and liberated from the bulk of the water by decanting or filtering. The isolated lacquer sludge is then mixed with solvent in process step (iii). Finally, in process step (iv), any water still present (e.g., as a result of phase separation, distillation or azeotropic distillation) and solid constituents are separated from the solvent phase by filtration or decanting. The resulting solution contains the chemically modified lacquer constituents which may be used again in a some manner. The solvent may remain for this additional use or it may be replaced by another solvent after being distilled off.

In order to optimize the yield it is also possible to extract the water separated off in accordance with process step iv) and/or the insoluble solid material in the organic solvent with a solvent of the type stated by way of example and to combine the solvent phase accumulating thereby with the bulk of the solution obtained in process step iv).

In the following examples all parts and percentages are by weight unless otherwise indicated.

EXAMPLE 1

1 kg of lacquer was sprayed in a booth equipped with a water-separation system. The lacquer was a 50% solvent-containing clear lacquer. The binding agent contained a commercial polyacrylate (Desmophen A 450, Bayer AG) having an OH content of 2.0%, based on solids, and trimerized hexamethylene diisocyanate (Desmodur N 3390, Bayer AG) with an NCO content of 19.4%. The coating components were present at an NCO:OH equivalent ratio of 1:1. The lacquer solvent was xylene. 50 g di-n-butylamine and 10 g of a commercial emulsifier (Emulgator NP 20, an ethoxylated nonyl phenol available from Bayer AG) were dissolved in the water to be sprayed. Also, to prevent adhesion, a coagulating agent (Ipafloc, an alumina product available from IPA) was added to the the water to be sprayed in a concentration of 0.4%. The mixture of water, anti-adhesion agent and fully reacted overspray was conveyed to a settling tank where it was mixed with 20%, based on the weight of the overspray, of a coagulating agent (Ipased, an alumina product available from IPA).

When the spraying process was complete, the deposited lacquer sludge (2.5 kg) was removed and charged into a 5 liter stirrer vessel. At room temperature 2.5 liters of xylene were added with vigorous stirring. The water was distilled off azeotropically, then the alumina was filtered off. The solution accumulating as filtrate contained 95% of the lacquer binder originally used, which which was suitable for reuse. The binder solution was reduced to a solids content of 50%.

The recovered binding agent was added to the previously described trimerized hexamethylene diisocyanate at an NCO:OH equivalent ratio of 1:1 and applied by spray application to a test plate as a two-component polyurethane lacquer. After curing at room temperature a clear, crosslinked, solvent resistant coating was obtained.

EXAMPLE 2

The procedure described in Example 1 was followed. However, instead of blending the recovered binder with additional polyisocyanate, the recovered binder was applied as a one-component polyurethane system and stoved for 30 minutes at 170° C. A clear, crosslinked, solvent resistant coating was obtained.

EXAMPLE 3

The procedure stated in Example 1 was followed with the exception that the lacquer sludge removed was treated with 2.5 liters of toluene. After the water was distilled off azeotropically and the alumina was filtered off, 2.5 g of tin (II) octoate was added to the recovered binder solution and the resulting mixture was processed in a spray dryer to form a powder lacquer. The powder lacquer was applied to a test plate and stoved for 30 minutes at 160° C. A clear, crosslinked, solvent resistant coating was obtained.

EXAMPLE 4

A lacquer sludge was prepared as described in Example 1 with the exception that the polyol was a commercial polyester (Desmophen 670, Bayer AG) having an OH content of 4.3%, based on solids, the lacquer solvent was butyl acetate and 100 g of water soluble diisopropylamine were added to the water to be sprayed instead of di-n-butylamine.

The resulting lacquer sludge was charged into a 5 liter stirred vessel. At room temperature 2.0 liters of butyl acetate were added. The binder was then recovered as described in Example 1. The recovered binding agent was added to the previously described trimerized hexamethylene diisocyanate at an NCO:OH equivalent ratio of 1:1 and applied by spray application to a test plate as a two-component polyurethane lacquer. After curing at room temperature a clear, crosslinked, solvent resistant coating was obtained.

EXAMPLE 5

The procedure described in Example 1 was followed with the exception that the polyisocyanate was a mixed trimer of toluene diisocyanate and hexamethylene diisocyanate (Desmodur HL, Bayer AG).

The recovered binding agent was mixed with 500 g of a polyacrylate polyol (Desmophen A 450, Bayer AG). The resulting mixture was added to the previously described mixed trimer at an NCO:OH equivalent ratio of 1:1 and applied by spray application to a test plate as a two-component polyurethane lacquer. After curing at room temperature a clear, crosslinked, solvent resistant coating was obtained.

EXAMPLE 6

The procedure described in Example 1 was followed with the exception that the polyol from Example 4 was used, 110 g of water soluble diisopropylamine were added to the water to be Sprayed instead of di-n-butylamine and the extraction solvent was cyclohexanone. The solution accumulating as filtrate contained 96% of the binding agent originally used.

The recovered binding agent was added to the trimerized hexamethylene diisocyanate to form a coating as described in Example 1. After curing at room temperature a clear, crosslinked, solvent resistant coating was obtained.

EXAMPLE 7

The procedure according to Example 1 was followed with the exception that 40 g of butanone oxime were emulsified in the water to be sprayed with the aid of 5 g of the emulsifier described in Example 1. In addition, the extraction solvent was toluene. The recovered binding agent was processed in a spray dryer to form a powder lacquer.

The powder lacquer was applied to a test plate and stoved for 30 minutes at 180° C. A clear, crosslinked, solvent resistant coating was obtained.

EXAMPLE 8

The procedure according to Example 1 was followed with the exception that 40 g of acetone oxime were dissolved in the water to be sprayed. In addition, the extraction solvent was butyl acetate and the water was distilled off azeotropically in a vacuum at 80° C. The solution accumulating as filtrate contained 96% of the binding agent originally used.

The recovered binding agent was applied as one-component polyurethane system and stoved for 30 minutes at 140° C. A clear, crosslinked, solvent resistant coating was obtained.

EXAMPLE 9

The procedure described in Example 1 was followed with the exception that the polyol was a commercial polyacrylate (Desmodur A 160, Bayer AG), having an OH content of 2.7%, based on solids, the lacquer solvent was xylene and 100 g of stearylamine (instead of di-n-butylamine) were emulsified in the water to be sprayed with the aid of 5 g of the emulsifier described in Example 1. In addition, cyclohexanone was used as the extraction solvent.

The recovered binding agent was added to the trimerized hexamethylene diisocyanate to form a coating as described in Example 1. After curing at room temperature a clear, crosslinked, solvent resistant coating was obtained.

EXAMPLE 10

The procedure described in Example 1 was followed with the exception that the polyol from Example 9 was used, 35 g of di-n-butylamine and 35 g of di-n-propylamine were emulsified in the water to be sprayed with the aid of 5 g of an emulsifier (Levapon OLN, Bayer AG). In addition, the extraction solvent was xylene.

The recovered binding agent was applied as a one-component polyurethane system by spray application. After 30 minutes at 160° C. a clear, crosslinked, solvent resistant coating was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for recovering and recycling the organic binder components accumulating as overspray during the spraying of a solvent-containing, two-component polyurethane lacquer or a solvent-containing, moisture-curing, one-component polyurethane lacquer which comprises
   i) washing the overspray out of the exhaust air of a coating plant with the aid of an aqueous medium which a) contains in dissolved or dispersed form a compound that exhibits greater reactivity towards isocyanate groups than either water or the isocyanate-reactive groups present in a two-component polyurethane lacquer, and b) may contain an emulsifier, ii) isolating the chemically modified overspray formed in step (i) in the form of lacquer sludge by treatment with a coagulating agent, which may be present in said aqueous medium, iii) mixing the lacquer sludge, containing fully reacted lacquer constituents, coagulating agents and water, optionally after a portion of the water is removed, with an organic solvent and iv) separating the organic phase accumulating in step iii) from the aqueous phase and insoluble constituents which may be present and recovering the solution of the modified binder components dissolved in the organic phase.

2. The process of claim 1 wherein said compound of process step i) comprises a primary or secondary monoamine having aliphatically or cycloaliphatically bound amino groups.

3. The process of claim 1 wherein said compound of process step i) comprises an oxime.

4. The process of claim 1 wherein said compound of process step i) comprises an amino alcohol.

5. The process of claim 1 which comprises blending the modified binder components recovered in process step iv) with a polyisocyanate to form a two-component polyurethane lacquer.

6. The process of claim 1 wherein the modified binder components recovered in process step iv) are suitable for use as a one-component polyurethane lacquer which may be crosslinked at elevated temperature to form a solvent resistant coating.

7. The process of claim 1 which comprises removing the solvent from the organic binder components recovered in process step iv) to form a powder lacquer which may be crosslinked at elevated temperature to form a solvent resistant coating.

8. The process of claim 1 which comprises treating the water and/or insoluble constituents separated according to process step (iv) with a solvent to recover additional modified binder components and combining the resulting solvent phase with the organic phase obtained according to process step iv).

* * * * *